(12) United States Patent
Tsai

(10) Patent No.: US 7,910,235 B2
(45) Date of Patent: Mar. 22, 2011

(54) SELF-CHARGING LITHIUM BATTERY

(76) Inventor: Hua-Hsin Tsai, Linnei Township, Yunlin County (TW)

( * ) Notice: Subject to any disclaimer, the term of this patent is extended or adjusted under 35 U.S.C. 154(b) by 818 days.

(21) Appl. No.: 11/473,234

(22) Filed: Jun. 23, 2006

(65) Prior Publication Data

US 2007/0298288 A1 Dec. 27, 2007

(51) Int. Cl.
*H01M 10/46* (2006.01)
*H01M 2/00* (2006.01)
*H02J 7/00* (2006.01)

(52) U.S. Cl. .......................... 429/10; 429/122; 320/108

(58) Field of Classification Search .............. 429/231.95, 429/10, 218, 122; 310/17; 368/204; 322/3; 29/623.1; 320/108
See application file for complete search history.

(56) References Cited

U.S. PATENT DOCUMENTS

| | | | | |
|---|---|---|---|---|
| 5,347,186 A | * | 9/1994 | Konotchick | 310/17 |
| 5,728,482 A | * | 3/1998 | Kawakami et al. | 429/10 |
| 2004/0004909 A1 | * | 1/2004 | Fujimori | 368/204 |

* cited by examiner

*Primary Examiner* — Jonathan Crepeau
*Assistant Examiner* — Kenneth Douyette
(74) *Attorney, Agent, or Firm* — Rosenberg, Klein & Lee

(57) ABSTRACT

A lithium battery includes a lithium battery body, and a generating device; the generating device is fitted on one side of the lithium battery body, and it includes a motive power mechanism, and a magnetic line of force cutting mechanism; the magnetic line of force cutting mechanism is connected to wires connected to inside of the lithium battery body; the motive power mechanism has a magnetic element therein, which will move so as to cause the magnetic line of force cutting mechanism to produce an induced current to charge the lithium battery body the when the lithium battery is manually moved.

5 Claims, 2 Drawing Sheets

SELF-CHARGING LITHIUM BATTERY

BACKGROUND OF THE INVENTION

1. Field of the Invention

The present invention relates to a self-charging lithium battery, more particularly one, which is equipped with a magnetic line of force cutting mechanism, and a motive power mechanism having a magnetic element capable of moving so as to cause the magnetic line of force cutting mechanism to produce an induced current to charge a body of the lithium battery when the lithium battery is manually moved.

2. Brief Description of the Prior Art

More people are using portable electronic equipments, e.g. mobile phones, laptop computers, and cameras, with improvement of the quality of life. Such electronic equipments are usually powered with batteries, and lithium batteries are relatively preferable for this application.

Referring to FIG. 2, a currently existing lithium battery 9 has an electrode edge 91 for contact with an electrode edge of a piece of electronic equipment, and it has to be recharged after having been used for a certain length of time.

Furthermore, currently existing lithium batteries have to be charged by means of connecting the electronic equipments to a power supply or connecting the lithium batteries to a charger connected to a power source. Therefore, the lithium batteries can't be charged in open countries where no power supply is available; the electronic equipments can't be used if electricity of the lithium batteries runs out and there is no spare battery.

SUMMARY OF THE INVENTION

It is a main object of the invention to provide a self-charging lithium battery to overcome the above-mentioned problems.

The self-charging lithium battery of the present invention includes a lithium battery body, and a generating device. The generating device is fitted on one side of the lithium battery body, and it includes a motive power mechanism, and a magnetic line of force cutting mechanism. Wires are connected to both the magnetic line of force cutting mechanism and inside of the lithium battery body. The motive power mechanism has a magnetic element therein, which will move so as to cause the magnetic line of force cutting mechanism to produce an induced current to charge the lithium battery body the when the lithium battery is manually moved.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
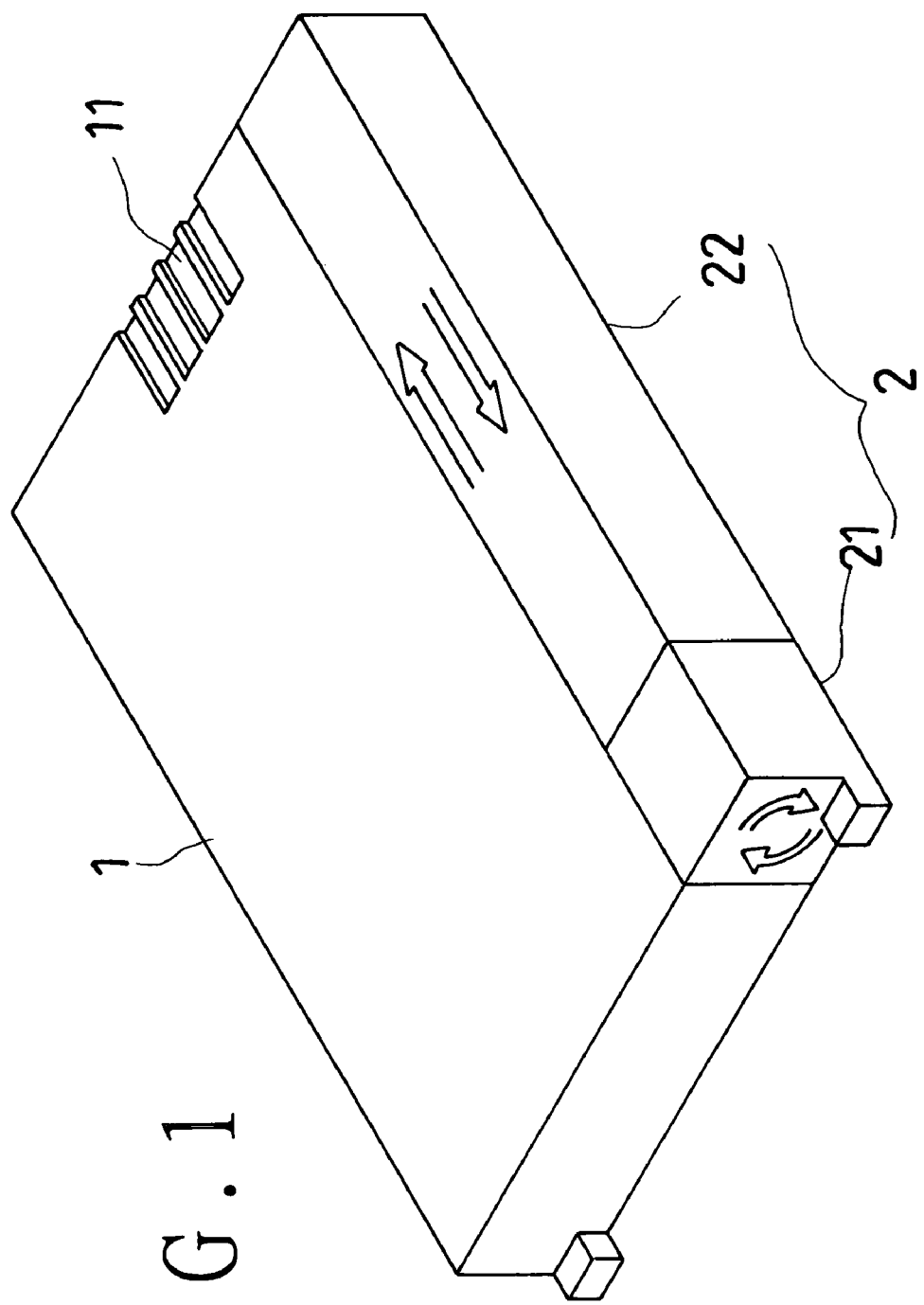
FIG. 1 is a perspective view of the present invention.
Figure 2:
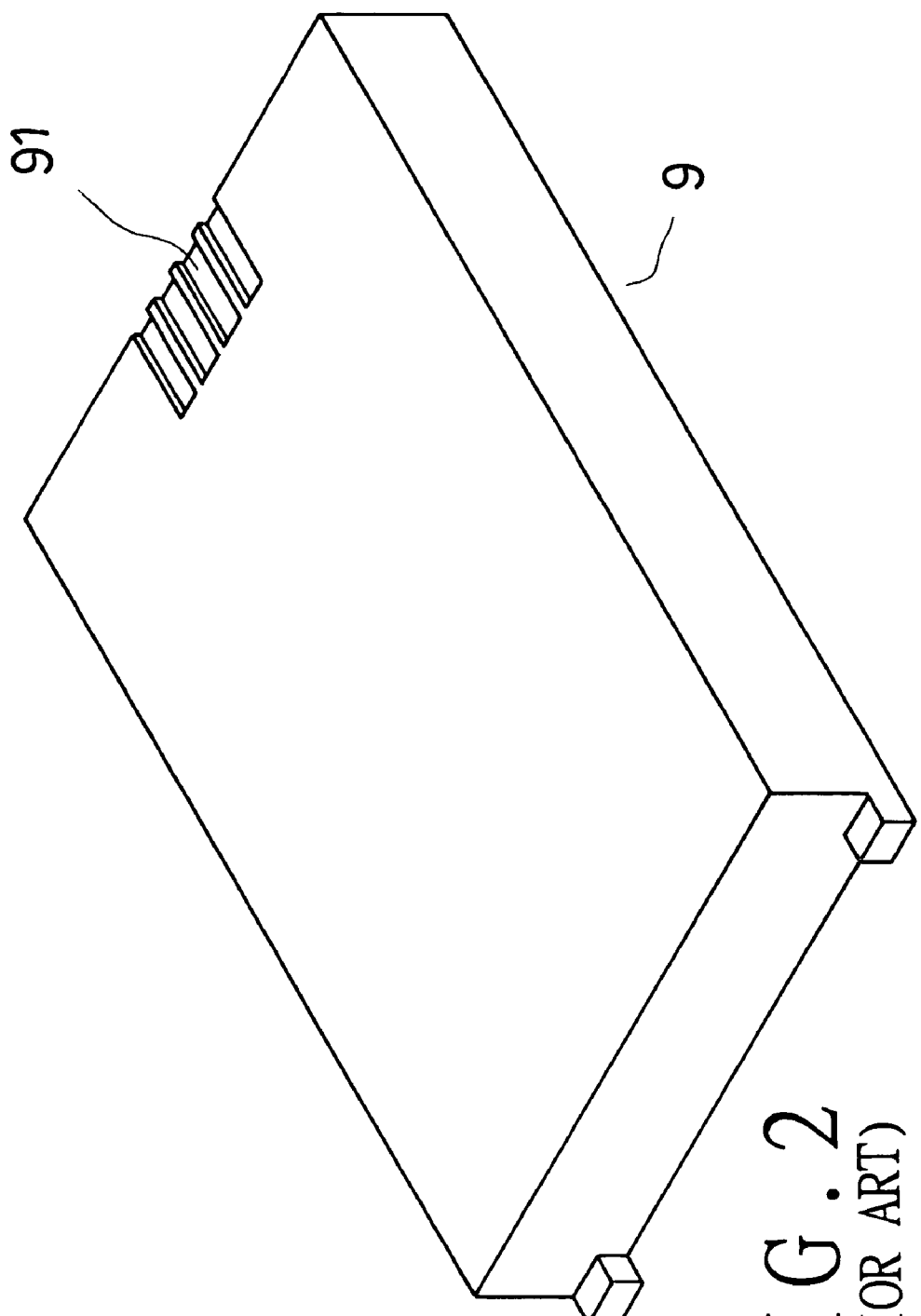
FIG. 2 is a perspective view of the prior art.

Referring to FIG. 1, a preferred embodiment of a self-charging lithium battery includes a lithium battery body 1, a generating device 2.

The generating device 2 is fitted on one side of the lithium battery body 1 for producing an electric current and charging the lithium battery body 1.

The lithium battery body 1 has capacitors therein for storing electricity, and an electrode edge 11 for contacting with an electrode edge of a piece of electronic equipment such as a mobile phone.

The generating device 2 includes a motive power mechanism 21, and a magnetic line of force cutting mechanism 22. The motive power mechanism 21 is manually moved for making a magnetic element repeatedly move into and out of or rotate within the magnetic line of force cutting mechanism 22. The magnetic line of force cutting mechanism 22 has coils, and ferrite films therein, and it is connected to wires connected to the capacitors of the lithium battery body 1; thus, when the magnetic element is moved into and out of the magnetic line of force cutting mechanism 22 repeatedly, an induced current will be produced to charge the lithium battery body 1.

To recharge the lithium battery, referring to FIG. 1, first the lithium battery is removed from the electronic equipment, and next the lithium battery is manually moved in a way according to the manner the magnetic element exists inside the motive power mechanism 21; for example, the lithium battery is shaken to and fro. Consequently, the magnetic element in the motive power mechanism 21 moves into and out of/in a revolving manner within the magnetic line of force cutting mechanism 22, and the magnetic line of force cutting mechanism 22 produces an induced electric current, which will travel into the capacitors of the lithium battery body 1 through the wires so as to charge the lithium battery body 1.

From the above description, it can be seen that the self-charging lithium battery of the present invention can be recharged even if there is no common power supply available, and the user doesn't need to worry that the battery would run out, and couldn't be recharged, and the portable electronic equipment couldn't be used in an open country.

What is claimed is:

1. A single piece self-charging lithium battery, comprising a lithium battery body; and
a generating device having the same length as the lithium battery body and mated on one side of the lithium battery body, the generating device including a motive power mechanism and a longitudinally extended magnetic line of force cutting mechanism; the magnetic line of force cutting mechanism being electrically coupled through a plurality of wires to the lithium battery body, said motive power mechanism being disposed at a longitudinal end of the magnetic line of force cutting mechanism;
said motive power mechanism including therein a magnetic element displaceable relative to the magnetic line of force cutting mechanism, a current being induced in the magnetic line of force cutting mechanism responsive thereto for charging the lithium battery body.

2. The self-charging lithium battery as recited in claim 1, wherein the motive power mechanism is made in such a way that a magnetic element can be moved into and out of the magnetic line of force cutting mechanism repeatedly by means of manually moving the motive power mechanism.

3. The self-charging lithium battery as recited in claim 1, wherein the motive power mechanism is made in such a way that a magnetic element can be rotated within the magnetic line of force cutting mechanism by means of manually moving the motive power mechanism.

4. The self-charging lithium battery as recited in claim 1, wherein the magnetic line of force cutting mechanism has plural coils therein.

5. The self-charging lithium battery as recited in claim 1, wherein the magnetic line of force cutting mechanism has a plurality of ferrite films therein.

* * * * *